United States Patent
Christofaro et al.

(10) Patent No.: US 7,201,398 B1
(45) Date of Patent: Apr. 10, 2007

(54) OFFSET JOINT BETWEEN STRUCTURAL MEMBERS IN A VEHICLE FRAME ASSEMBLY TO FACILITATE A COATING PROCESS

(75) Inventors: Paul A. Christofaro, Reading, PA (US); Steven C. Greenawalt, Reading, PA (US)

(73) Assignee: Dana Corporation, Toledo, OH (US)

( * ) Notice: Subject to any disclaimer, the term of this patent is extended or adjusted under 35 U.S.C. 154(b) by 90 days.

(21) Appl. No.: 10/279,085

(22) Filed: Oct. 23, 2002

(51) Int. Cl.
*B62D 21/00* (2006.01)

(52) U.S. Cl. ............... 280/781; 180/312; 296/29; 296/30

(58) Field of Classification Search ........... 280/781, 280/796, 797, 798, 800; 180/312; 296/29, 296/204, 30, 205
See application file for complete search history.

(56) References Cited

U.S. PATENT DOCUMENTS

| | | | |
|---|---|---|---|
| 2,327,585 A * | 8/1943 | Ulrich | 52/787.1 |
| 3,828,515 A | 8/1974 | Galgoczy et al. | |
| 4,423,899 A * | 1/1984 | Langmead | 296/3 |
| 5,409,283 A * | 4/1995 | Ban | 296/35.1 |
| 5,558,369 A * | 9/1996 | Cornea et al. | 280/800 |
| 5,823,287 A * | 10/1998 | Chidamparam et al. | 180/377 |
| 5,899,498 A * | 5/1999 | Horton | 280/781 |
| 6,045,196 A | 4/2000 | Mason | |
| 6,269,902 B1 * | 8/2001 | Miyagawa | 180/312 |
| 6,439,608 B1 * | 8/2002 | Bonnville | 280/796 |
| 6,592,176 B2 * | 7/2003 | Lumpe et al. | 296/210 |
| 6,733,040 B1 * | 5/2004 | Simboli | 280/800 |

\* cited by examiner

*Primary Examiner*—D. Glenn Dayoan
*Assistant Examiner*—Toan C. To
(74) *Attorney, Agent, or Firm*—MacMillan, Sobanski & Todd, LLC (57) ABSTRACT

A joint between two or more structural members in a vehicular body and frame assembly facilitates the application of a coating of a material thereto after assembly of the joint. The first and second structural members have respective outer surfaces provided thereon. A spacer is provided either as a portion of a reinforcement member disposed within the first structural member or integrally with the first structural member. The first structural member is connected to the second structural member with the spacer therebetween so as to define a joint defining a gap between the outer surfaces of the first and second structural members. Lastly, a coating of a material is applied to the outer surfaces of the first and second structural members.

10 Claims, 6 Drawing Sheets

OFFSET JOINT BETWEEN STRUCTURAL MEMBERS IN A VEHICLE FRAME ASSEMBLY TO FACILITATE A COATING PROCESS

BACKGROUND OF THE INVENTION

This invention relates in general to body and frame assemblies for vehicles. In particular, this invention relates to an improved structure for a joint between two or more structural members in such a vehicular body and frame assembly that facilitates the application of a coating of a material thereto after assembly of the joint.

Many land vehicles in common use, such as automobiles, vans, and trucks, include a body and frame assembly that is supported upon a plurality of ground-engaging wheels by a resilient suspension system. The structures of known body and frame assemblies can be divided into two general categories, namely, separate and unitized. In a typical separate body and frame assembly, the structural components of the body portion and the frame portion of the vehicle are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and the frame portion are combined into an integral unit that is resiliently supported upon the vehicle wheels by the suspension system. Unitized body and frame assemblies of this general type are found in many relatively small modern vehicles, such as automobiles and minivans.

In both separate and unitized types of vehicular body and frame assemblies, a plurality of structural members are connected together to form the body and frame assembly. At each location where two or more of these structural members are connected together, a joint is defined. Because a typical vehicular body and frame assembly is composed of a relatively large number of structural members, a relatively large number of joints are defined therein. At each of the joints, the connection between the associated structural members may be accomplished using a variety of joint-forming mechanisms. For example, the structural members may be connected together by means of threaded fasteners, welding, adhesives, and the like. Usually, portions of the structural members are moved into abutment with one another to allow the joint-forming mechanism to connect them together.

In some instances, it is desirable to provide some or all of the structural members of the vehicular body and frame assembly with a coating of a material. For example, it is often desirable to provide some or all of such structural members with a protective coating of a corrosion resistant material. In the past, these coatings have been applied individually to each of the structural members before they were assembled and connected together to form the vehicular body and frame assembly. This was done to insure that all of the surfaces of all of the structural members, including those surfaces that abutted one another at the joints of the vehicular body and frame assembly, were properly coated with the material. Although effective, this process has been found to be relatively time consuming and expensive. To address this, it has been proposed to initially assemble and connect some or all of the various structural members together, then to apply the coating to the assembled vehicular body and frame assembly. However, the initial assembly of the vehicular body and frame assembly makes is difficult to apply the coating of the material to the portions of the structural members that abut one another at the various joints. Thus, it would be desirable to provide an improved structure for a joint between two or more structural members in such a vehicular body and frame assembly that facilitates the application of a coating of a material thereto after assembly of the joint.

SUMMARY OF THE INVENTION

This invention relates to an improved structure for a joint between two or more structural members in a vehicular body and frame assembly that facilitates the application of a coating of a material thereto after assembly of the joint. The first and second structural members have respective outer surfaces provided thereon. A spacer is provided either as a portion of a reinforcement member disposed within the first structural member or integrally with the first structural member. The first structural member is connected to the second structural member with the spacer therebetween so as to define a joint defining a gap between the outer surfaces of the first and second structural members. Lastly, a coating of a material is applied to the outer surfaces of the first and second structural members.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
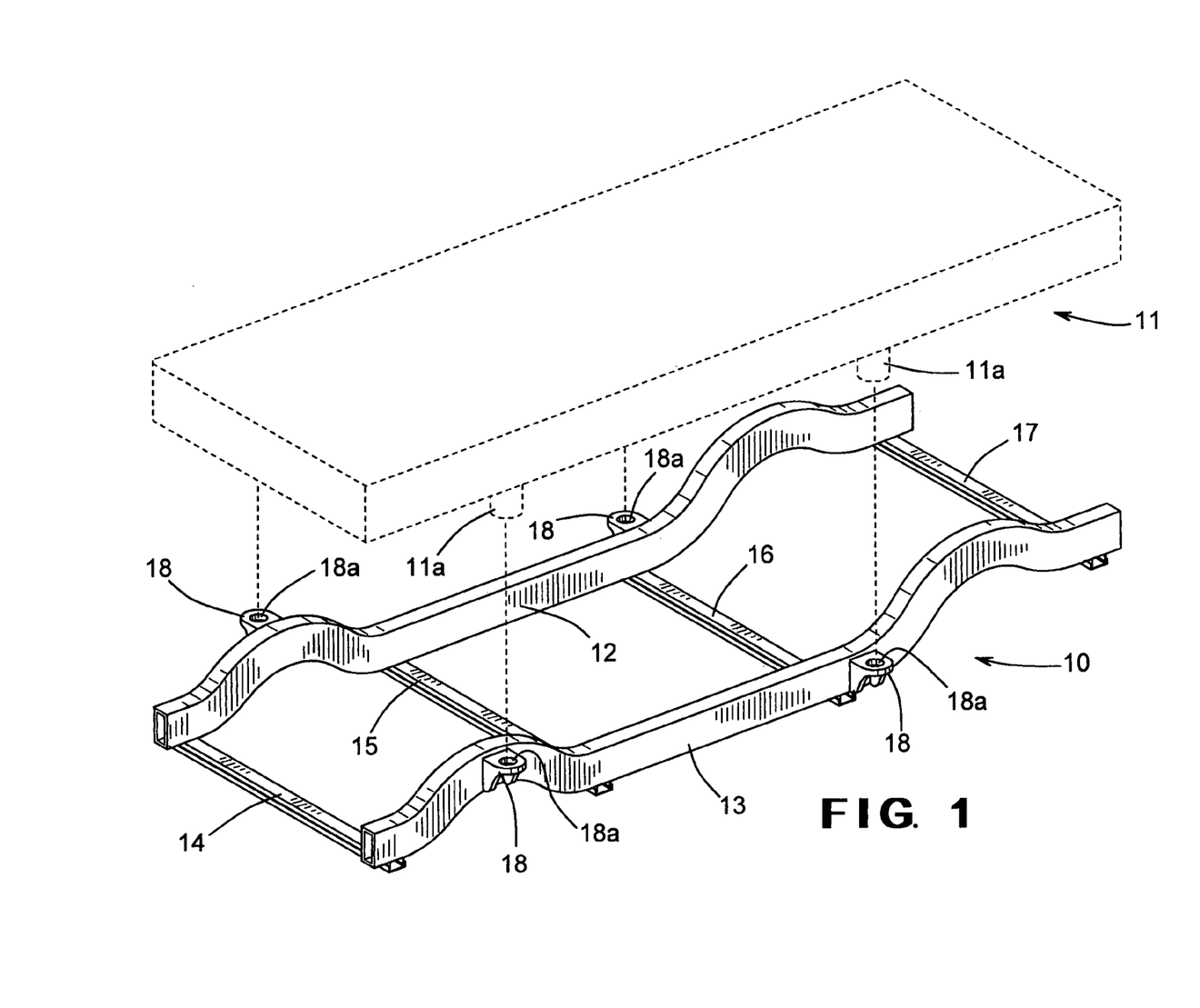
FIG. 1 is a perspective view of a vehicular body and frame assembly including a plurality of joints that have been manufactured in accordance with this invention.

Referring now to the drawings, there is illustrated in FIG. 1 a portion of a vehicular body and frame assembly that has been manufactured in accordance with this invention. The illustrated vehicular body and frame assembly is, in large measure, conventional in the art and is intended merely to illustrate one environment in which this invention may be used. Thus, the scope of this invention is not intended to be limited for use with the specific structure for the vehicular body and frame assembly illustrated in FIG. 1 or with vehicular body and frame assemblies in general. On the contrary, as will become apparent below, this invention may be used in any desired environment for the purposes described below.

The illustrated vehicular body and frame assembly is a separate type of body and frame assembly, including a frame portion, indicated generally at 10, and a body portion, indicated generally at 11. The illustrated frame portion 10 of the vehicular body and frame assembly is a ladder type frame portion, including a pair of longitudinally extending side rails 12 and 13 having a plurality of transverse cross members 14, 15, 16, and 17 extending therebetween. The side rails 12 and 13 extend longitudinally throughout the entire length of the frame portion 10 and are generally parallel to one another. Each of the side rails 12 and 13 in the illustrated embodiment is formed from a single closed channel structural member having an upper wall, a lower wall, and a pair of side walls. However, it is known that one or both of the side rails 12 and 13 may be formed from a plurality of individually formed closed channel structural members that are secured together by any conventional means, such as by welding, riveting, bolting, and the like. Furthermore, it is known that portions or all of the side rails 12 and 13 may be formed from open channel structural members.

The cross members 14 through 17 extend generally perpendicular to the side rails 12 and 13 and are generally parallel to one another. Each of the cross members 14 through 17 in the illustrated embodiment is formed from a single closed channel structural member having an upper wall, a lower wall, and a pair of side walls. However, it is known that some or all of the cross members 14 through 17 may be formed from a plurality of individually formed closed channel structural members that are secured together by any conventional means, such as by welding, riveting, bolting, and the like. Furthermore, it is known that portions or all of the cross members 14 through 17 may be formed from open channel structural members. The cross members 14 through 17 are spaced apart from one another along the length of the frame portion 10 and can be secured to the side rails 12 and 13 by any conventional means, such as by welding, riveting, bolting, and the like. When secured to the side rails 12 and 13, the cross members 14 through 17 provide lateral and torsional rigidity to the frame portion assembly 10 of the vehicular body and frame assembly.

A plurality of body mount support brackets 18 are provided on the vehicle frame assembly 10. The illustrated body mount support brackets 18 are stamped members that are secured to the side rails 12 and 13 of the vehicular body and frame assembly 10 by any conventional means, such as by welding, adhesives, and the like. The body mount support brackets 18 are provided to facilitate the connection of the body portion 11 and other various components (not shown) of the vehicle to the vehicular body and frame assembly 10. To accomplish this, each of the body mount brackets 18 has an opening 18*a* formed therethrough. The openings 18*a* are sized in accordance with respective body mounts 11*a* provided on the body portion 11 of the vehicular body and frame assembly 10. In a manner that is well known in the art, the body mounts 11*a* are received and supported within the openings 18*a* of the body mount support brackets 18 to connect the body portion 11 to the frame portion 10.

At each location where two or more of the structural members 12 through 17 are connected together to form the vehicular body and frame assembly, a joint is defined. The structure of one of such joints between the side rail 13 and a first embodiment of the cross member 15 is illustrated in detail in FIGS. 2, 3, and 4. As shown therein, the cross member 15 is formed from first and second C-shaped structural members 15*a* and 15*b* that are oriented to face inwardly toward one another and are secured together to form the closed channel structural member. The first C-shaped structural member 15*a* has a pair of apertures 15*a*' (see FIG. 4) formed through the web portion thereof. Similarly, the second C-shaped structural member 15*b* has a pair of apertures 15*b*' (see FIG. 4) formed through the web portion thereof. Preferably, the apertures 15*a*' formed through the first C-shaped structural member 15*a* are respectively aligned with the apertures 15*b*' formed through the second C-shaped structural member 15*b*. The purpose for such apertures 15*a*' and 15*b*' will be explained below.

Figure 2:
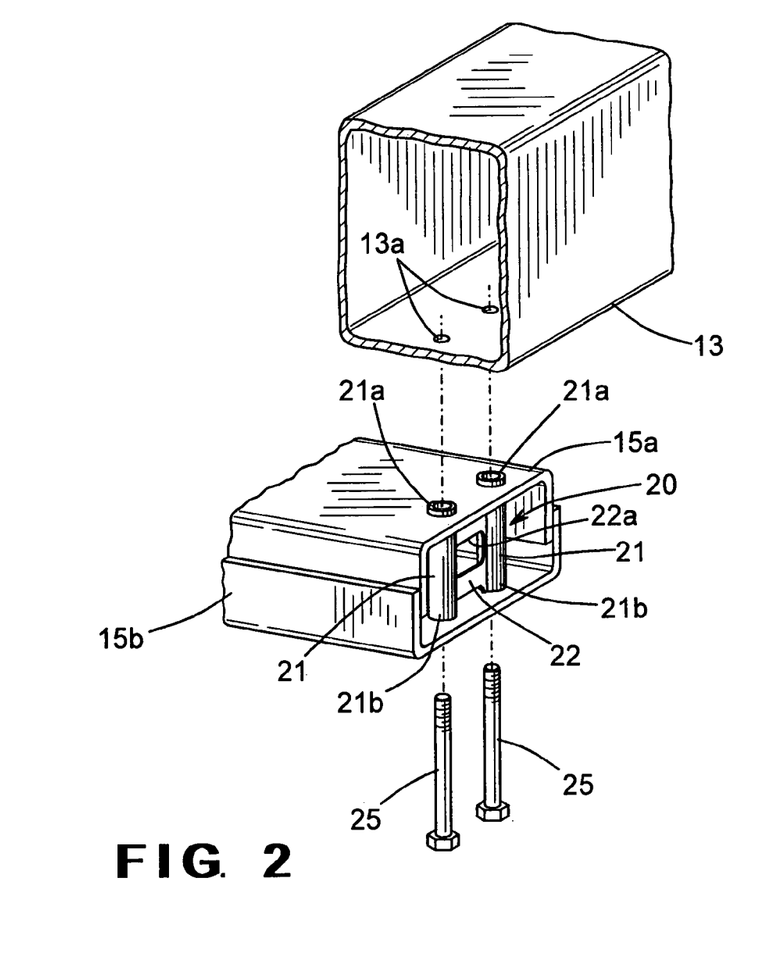
FIG. 2 is an enlarged exploded perspective view of a first embodiment of a joint between one of the side rails and one of the cross members illustrated in FIG. 1 shown prior to assembly.
Figure 3:
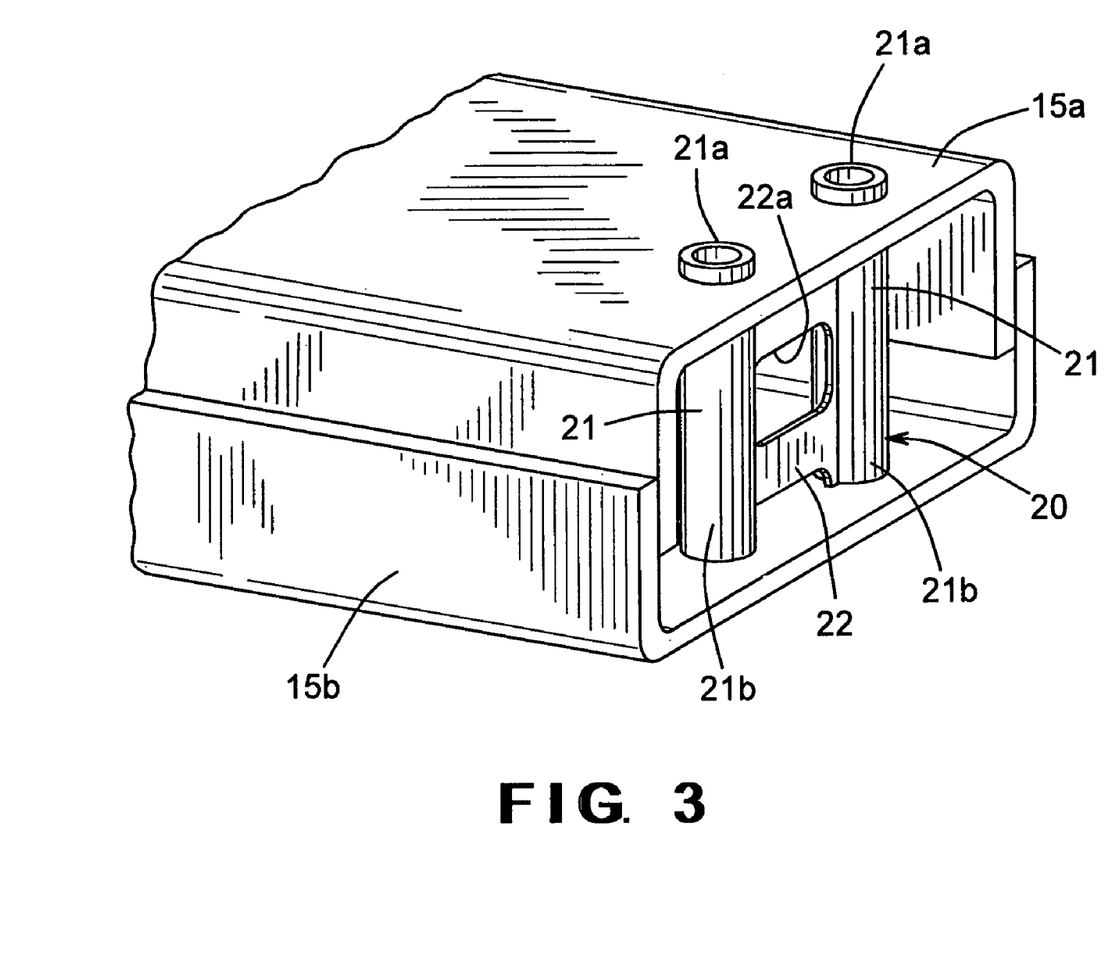
FIG. 3 is a further enlarged perspective view of the cross member illustrated in FIG. 2.
Figure 4:
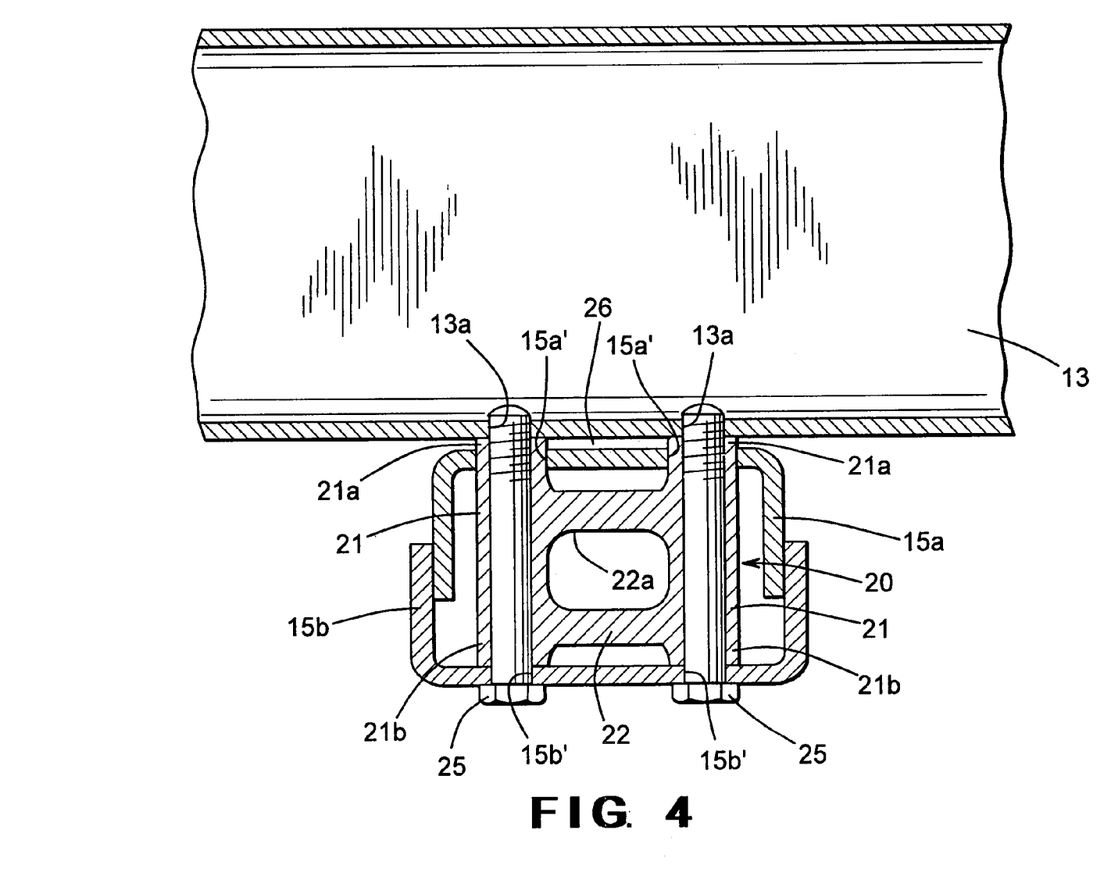
FIG. 4 is a sectional elevational view of the first embodiment of the joint illustrated in FIG. 2 shown after assembly.

A reinforcement member, indicated generally at 20, is disposed within the cross member 15 between the first and second C-shaped structural members 15*a* and 15*b*. The illustrated reinforcement member 20 includes a pair of side portions 21 that are connected together by a central web portion 22. Each of the side portions 21 of the reinforcement member 20 is generally hollow and cylindrical in shape (although such is not required) and extends from an upper end 21*a* to a lower end 21*b*. The web portion 22 of the reinforcement member 20 is generally flat and rectangular in shape (although such is not required) and may have an opening 22*a* formed therethrough for the purpose of reducing its overall weight. The reinforcement member 22 is preferably sized such that the hollow cylindrical side portions 21 are aligned with the pairs of apertures 15*a*' and 15*b*' respectively formed through the first and second C-shaped structural members 15*a* and 15*b*.

The apertures 15*a*' formed through the first C-shaped structural member 15*a* are preferably formed to be slightly larger than the upper ends 21*a* of the side portions 21 of the reinforcement member 20. Thus, as shown in FIGS. 2, 3, and 4, the upper ends 21*a* of the side portions 21 of the reinforcement member 20 can extend through the apertures 15*a*' formed through the first C-shaped structural member 15*a*. The apertures 15*b*' formed through the second C-shaped structural member 15*b* are preferably sized to be smaller than the lower ends 21*b* of the side portions 21 of the reinforcement member 20. Thus, as also shown in FIGS. 2, 3, and 4, the lower ends 21*b* of the side portions 21 do not extend through the apertures 15*b*' formed through the second C-shaped structural member 15*b*, but rather abut the inner surface thereof.

As shown in FIGS. 2 and 4, a pair of apertures 13*a* is formed through a portion of the side rail 13. Preferably, the apertures 13*a* are threaded, although such is not required. The apertures 13*a* formed through the side rail 13 are preferably positioned to be aligned with the apertures 15*a*' formed through the first C-shaped structural member 15*a* and the side portions 21 of the reinforcement member 20. Thus, to assemble the joint between the side rail 13 and the cross member 15, one or more threaded fasteners (such as a pair of bolts 25) can be respectively inserted through the apertures 15*b*' formed through the second C-shaped structural member 15*b* and through the hollow cylindrical side portions 21 of the reinforcement member 20 into threaded engagement with the threaded apertures 13*a* formed through the side rail 13. The bolts 25 are effective to secure the cross member 15 to the side rail 13 to form the joint therebetween. If desired, the apertures 13*a* formed through the side rail 13 need not be threaded, but rather may be through apertures. In this instance, a pair of threaded nuts (not shown) may be provided within the interior of the side rail 13 for engagement with the threaded fasteners 25.

As shown in FIG. 4, the upper ends 21a of the side portions 21 of the reinforcement member 20 function as spacers to provide and maintain a gap 26 between the upper outer surface of the cross member 15 and the lower outer surface of the side rail 13. This gap 26 is provided to facilitate the application of a coating of a material to the outer surfaces of the side rail 13 and the cross member 15 after assembly of the joint. Preferably, the gap 26 defines a space of approximately four millimeters between the upper outer surface of the cross member 15 and the lower outer surface of the side rail 13. However, the gap 26 may have any desired size. Any desired material can be used to coat the outer surfaces of the side rail 13 and the cross member 15. Such material can be easily sprayed, dipped, or otherwise applied to the outer surfaces of the side rail 13 and the cross member 15 because of the gap 26. The only portions of the outer surface of the side rail 13 that are not exposed for coating are those portions that are directly engaged by the upper ends 21a of the side portions 21 of the reinforcement member 20. However, these portions of the outer surface of the side rail 13 are physically small and, in any event, are tightly engaged by the upper ends 21a of the side portions 21 of the reinforcement member 20. Thus, the lack of a coating of the material on these portions of the outer surface of the side rail 13 is inconsequential.

Figure 5:
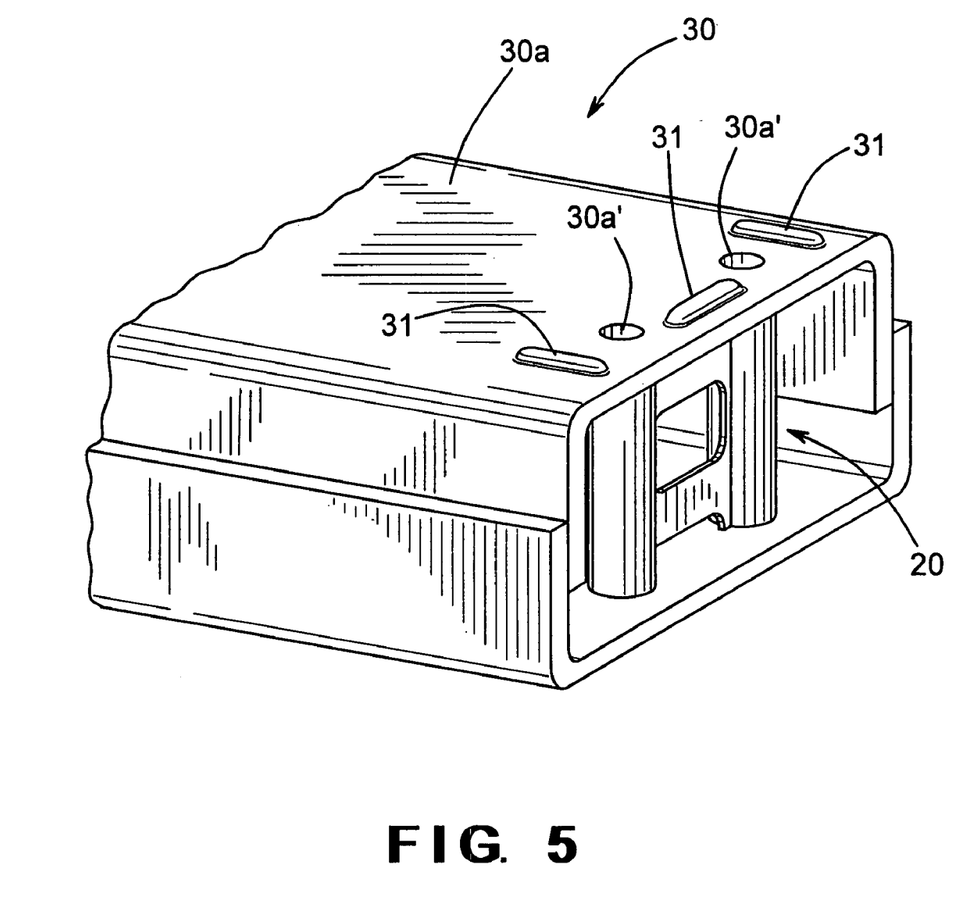
FIG. 5 is an enlarged perspective view of a second embodiment of a cross member adapted for use in a joint with the side rail illustrated in FIGS. 1, 2, and 4 in accordance with this invention.

FIG. 5 is an enlarged perspective view of a second embodiment of a cross member, indicated generally at 30, that is adapted for use in a joint with the side rail 13 illustrated in FIGS. 1, 2, and 4 in accordance with this invention. As above, the cross member 30 is formed from first and second C-shaped structural members 30a and 30b that are oriented to face inwardly toward one another and are secured together to form the closed channel structural member. The first C-shaped structural member 30a has a pair of apertures 30a' formed through the web thereof. Similarly, the second C-shaped structural member 30b has a pair of apertures (not shown) formed through the web thereof. Preferably, the apertures 30a' formed through the first C-shaped structural member 30a are respectively aligned with the apertures formed through the second C-shaped structural member 30b. The upper surface of the first C-shaped structural member 30a has one or more raised darts 31 or similar embossments formed thereon. Each of the darts 31 is somewhat elongated in shape and extends a predetermined distance above the upper surface of the first C-shaped structural member 30a. The above-described reinforcement member 20 is disposed within the cross member 30 between the first and second C-shaped structural members 30a and 30b. The reinforcement member 20 functions in the same manner as described above, except that the upper ends 21a of the side portions 21 do not extend through the apertures 30a' formed through the first C-shaped structural member 30a. Rather, when the cross member 30 is assembled with the side rail 13, the darts 31 function as spacers to provide and maintain the gap 26 between the upper surface of the cross member 30 and the lower surface of the side rail 13.

Figure 6:
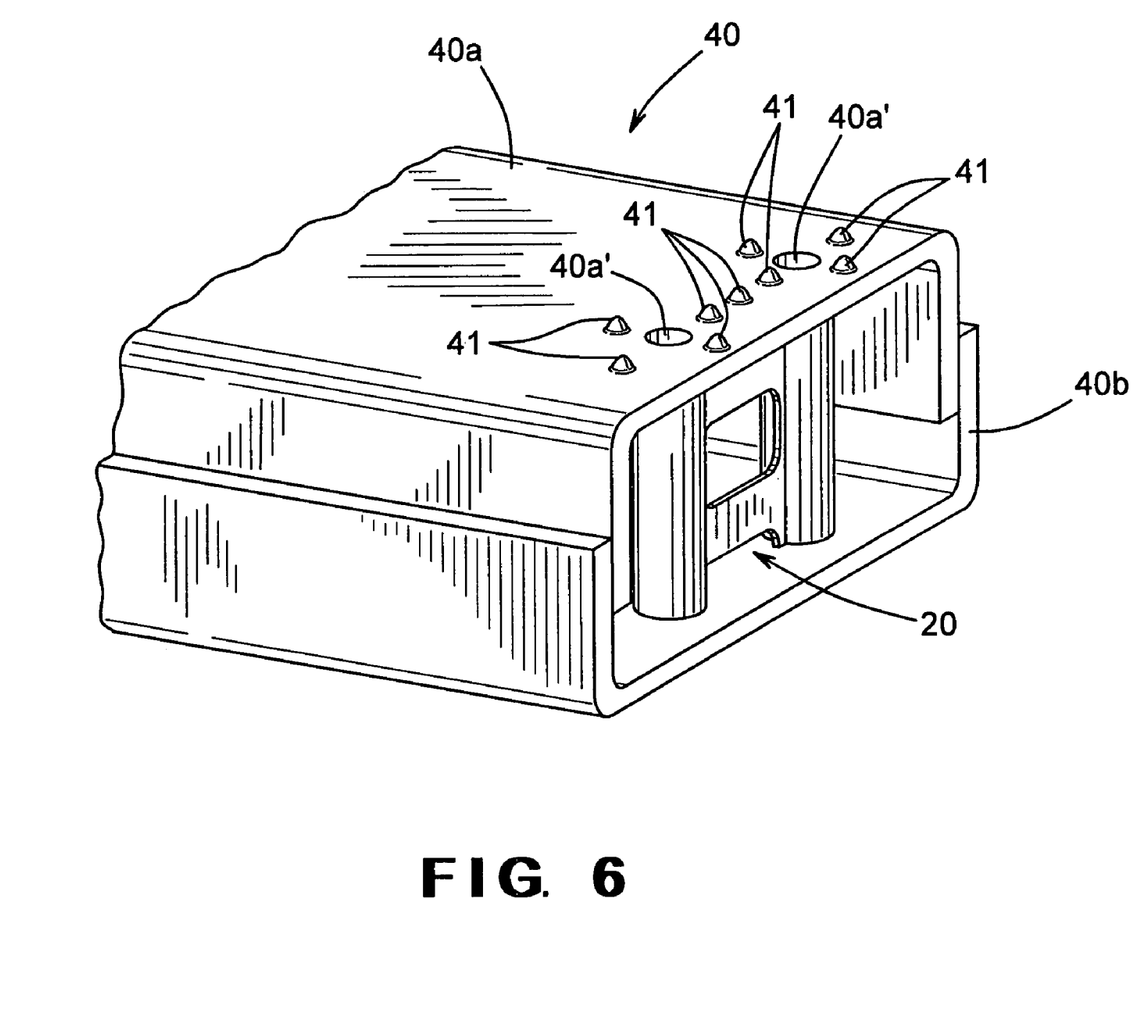
FIG. 6 is an enlarged perspective view of a third embodiment of a cross member adapted for use in a joint with the side rail illustrated in FIGS. 1, 2, and 4 in accordance with this invention.

FIG. 6 is an enlarged perspective view of a third embodiment of a cross member, indicated generally at 40, that is adapted for use in a joint with the side rail 13 illustrated in FIGS. 1, 2, and 4 in accordance with this invention. As above, the cross member 40 is formed from first and second C-shaped structural members 40a and 40b that are oriented to face inwardly toward one another and are secured together to form the closed channel structural member. The first C-shaped structural member 40a has a pair of apertures 40a' formed through the web thereof. Similarly, the second C-shaped structural member 40b has a pair of apertures (not shown) formed through the web thereof. Preferably, the apertures 40a' formed through the first C-shaped structural member 40a are respectively aligned with the apertures formed through the second C-shaped structural member 40b. The upper surface of the first C-shaped structural member 40a has one or more raised dimples 41 or similar embossments formed thereon. Each of the dimples 41 is relatively small and circular in shape and extends a predetermined distance above the upper surface of the first C-shaped structural member 40a. The above-described reinforcement member 20 is disposed within the cross member 40 between the first and second C-shaped structural members 40a and 40b. The reinforcement member 20 functions in the same manner as described above, except that the upper ends 21a of the side portions 21 do not extend through the apertures 40a' formed through the first C-shaped structural member 40a. Rather, when the cross member 40 is assembled with the side rail 13, the dimples 41 function as spacers to provide and maintain the gap 26 between the upper surface of the cross member 40 and the lower surface of the side rail 13.

Although this invention has been described in the context of the illustrated joint between the side rail 13 and the various embodiments of the cross member 15, 30, and 40, it will be appreciated that this invention can be used to connect any other components of the vehicle body and frame assembly. For example, this invention can be used to secure one or more of the body mount brackets 18 to the side rails 12 and 13.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A joint comprising:
    a first structural member including first and second web portions, said first web portion defining an entire outer joint surface and having an aperture formed therethrough;
    a second structural member including an entire outer joint surface; and
    a reinforcement member disposed within said first structural member, said reinforcement member including a first end that engages said second web portion and a second end that extends through said aperture into engagement with said outer surface of said second structural member, said reinforcement member maintaining a gap between said entire outer joint surfaces of said first and second structural members.

2. The joint defined in claim 1 wherein said first structural member is a side rail for a vehicular frame assembly and said second structural member is a cross member for a vehicular frame assembly.

3. The joint defined in claim 1 wherein a coating of a material applied to said outer surfaces of said first and second structural members.

4. The joint defined in claim 1 wherein said second web portion has an aperture formed therethrough, and wherein a fastener extends through said apertures formed through said first and second web portions to secure said first and second structural members together.

5. The joint defined in claim 4 wherein said second structural member has an aperture formed therethrough, and wherein said fastener extends through said aperture formed through said second structural member to secure said first and second structural members together.

6. The joint defined in claim 5 wherein said aperture formed through said second structural member is threaded, and wherein said fastener is a threaded fastener that cooperates with said threaded aperture.

7. The joint defined in claim 1 wherein said first web portion has a pair of apertures formed therethrough, and wherein said reinforcement member includes a pair of first ends that each engage said second web portion and a pair of second ends that respectively extend through said apertures into engagement with said outer surface of said second structural member.

8. The joint defined in claim 7 wherein said second web portion has a pair of apertures formed therethrough, and wherein a pair of fasteners respective extend through said pair of apertures formed through said first and second web portions to secure said first and second structural members together.

9. The joint defined in claim 8 wherein said second structural member has a pair of apertures formed therethrough, and wherein said pair of fasteners respectively extend through said pair of apertures formed through said second structural member to secure said first and second structural members together.

10. The joint defined in claim 9 wherein each of said pair of apertures formed through said second structural member is threaded, and wherein each of said pair of fasteners is a threaded fastener that cooperates with said pair of threaded apertures.

* * * * *